(12) United States Patent
Poturalski et al.

(10) Patent No.: US 6,394,395 B1
(45) Date of Patent: May 28, 2002

(54) COMBINATION SOLAR ARRAY ASSEMBLY AND ANTENNA FOR A SATELLITE

(75) Inventors: Heidi N. Poturalski; Jose L. Valenzuela, both of Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/609,987

(22) Filed: Jul. 5, 2000

Related U.S. Application Data
(60) Provisional application No. 60/189,363, filed on Mar. 15, 2000.

(51) Int. Cl.⁷ .................................................. B64G 1/42
(52) U.S. Cl. ........................................................ 244/173
(58) Field of Search .............................. 244/173, 163, 244/158 R

(56) References Cited

U.S. PATENT DOCUMENTS

| | | | |
|---|---|---|---|
| 3,594,803 A | 7/1971 | Pucillo | 343/720 |
| 4,864,317 A | 9/1989 | Sorko-Ram | 343/170 |
| 5,665,274 A | * 9/1997 | Long et al. | 252/511 |
| 6,064,859 A | * 5/2000 | Leopold et al. | 455/13.1 |
| 6,260,804 B1 | * 7/2001 | Anderson et al. | 244/158 R |

FOREIGN PATENT DOCUMENTS

JP         411171100 A   *  6/1999   ............. 244/158 R

* cited by examiner

*Primary Examiner*—Peter M. Poon
*Assistant Examiner*—Timothy D. Collins
(74) *Attorney, Agent, or Firm*—Marsh Fischmann & Breyfogle LLP

(57) ABSTRACT

The invention is a combination solar panel and planar array antenna for a satellite. In detail, the invention includes a generally flat solar panel having external and internal surfaces, the external surface having solar energy collecting devices thereon. A generally flat planar antenna having external and internal surfaces is coupled to the flat solar panel, with the external surface for receiving and transmitting electromagnetic energy. The planar array is coupled to the solar panel such that the interior surfaces of the solar array and the planar antenna face each other. The interior surfaces of the solar array and the planar antenna are high emissive thermal surfaces. The external surface of the planar array is a low absorptivity and high emissivity surface.

18 Claims, 7 Drawing Sheets

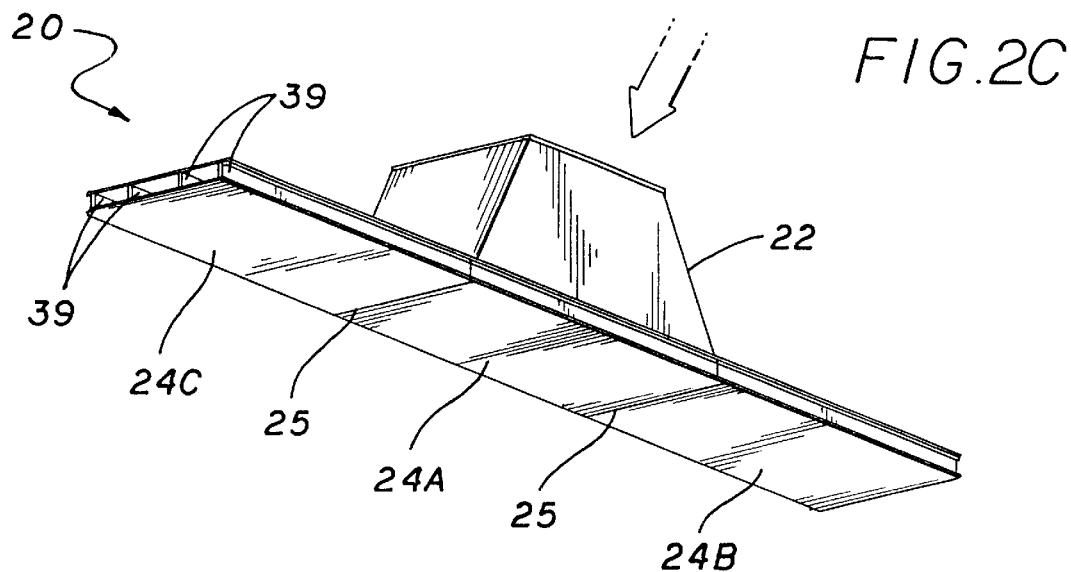
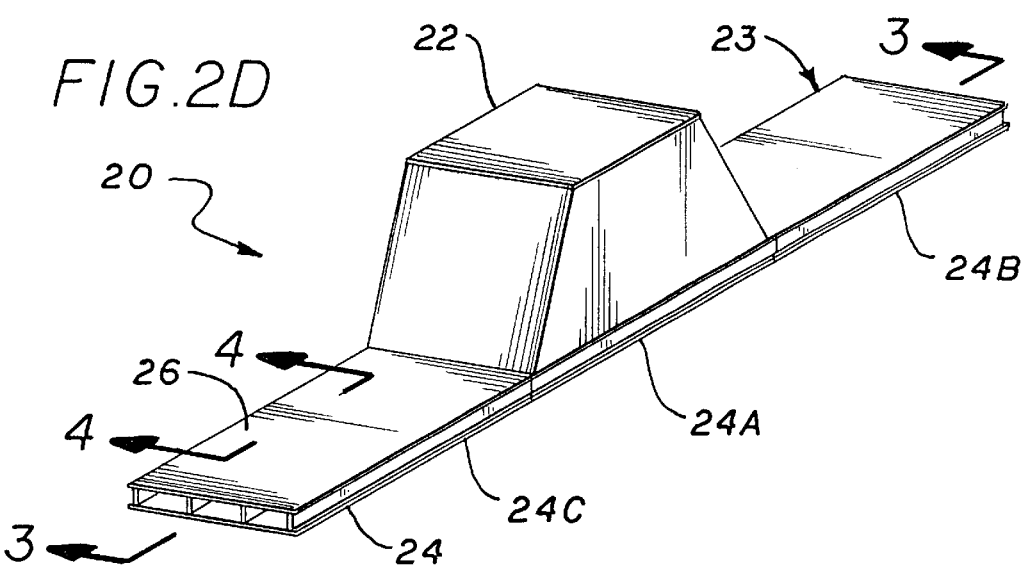
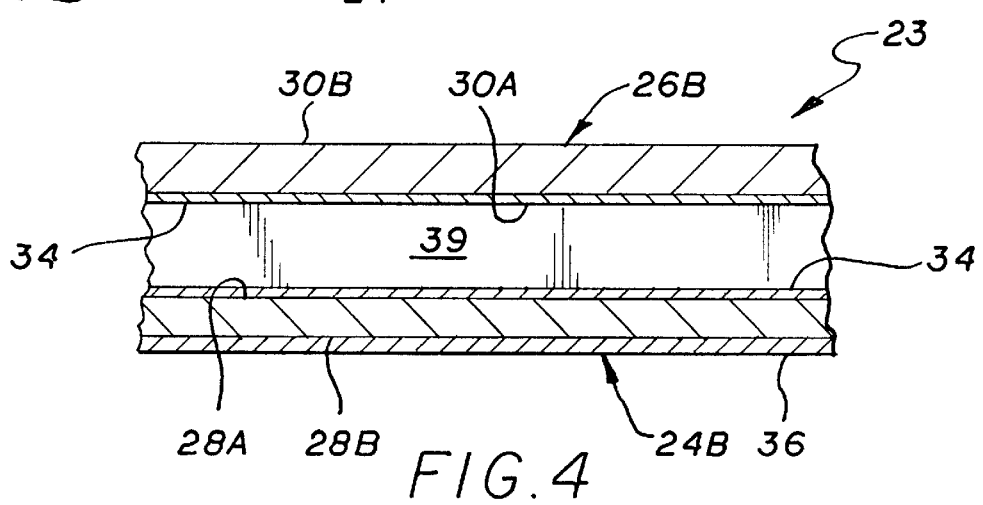

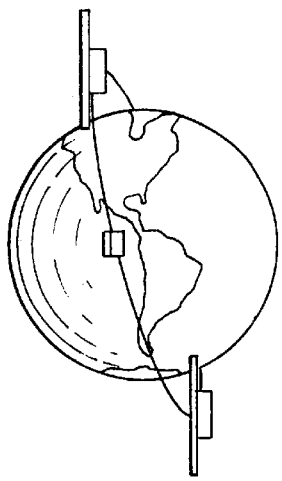
FIG.6
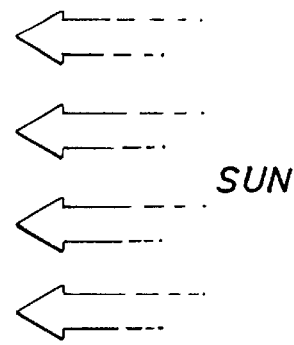
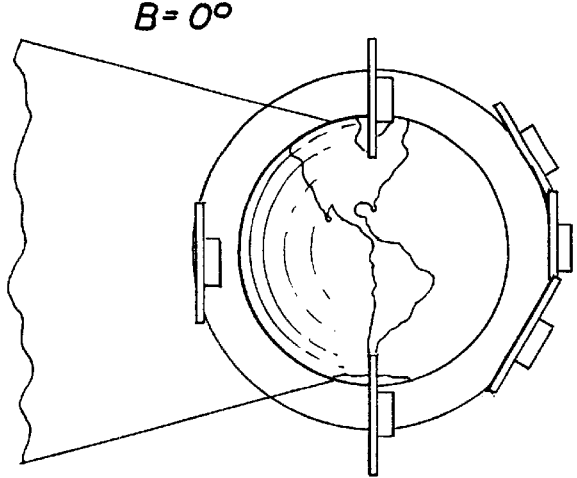
FIG.7
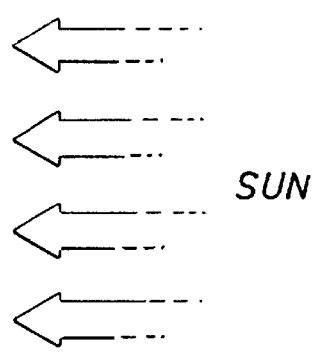
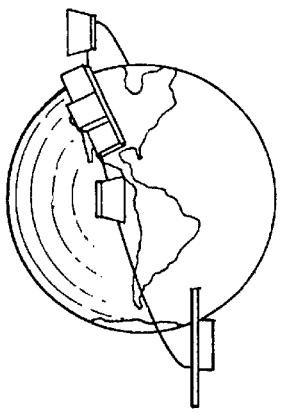
FIG.8
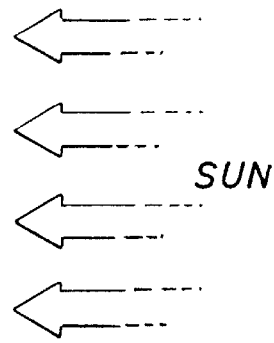

COMBINATION SOLAR ARRAY ASSEMBLY AND ANTENNA FOR A SATELLITE

CROSS REFERENCE TO RELATED APPLICATIONS

This patent application is a continuation-in-part of co-pending U.S. Provisional Patent Application Serial No. 60/189,363, filed Mar. 15, 2000.

BACKGROUND OF THE INVENTION

1. Field of the Invention

The invention relates to the field of planet orbiting satellites and, in particular, to combined solar array and antenna assembly for a satellite wherein thermal balance is maintained between the two.

2. Description of Related Art

Thermal management of satellite systems is complex, costly, and difficult to achieve. There are tremendous heat dissipation requirements, typically in the 10 kW to 15 kW range. High component density, large surface areas, and the low volume available for thermal control systems aggravate this. For example, a typical satellite may have a 400 to 600 square foot planar array antenna payload and single or two axes tracking solar arrays. In this configuration, a spacecraft moves through various beta angles (the angle of the sun to the orbital plane), spacecraft re-orientations are required to maintain solar array tracking. This configuration also requires at least two separate deployment sequences, one for the solar array assembly and one for the planar array antenna. Of course, deployment mechanisms and latches that are separately required for the solar array assembly and planar array antenna.

The driving thermal factor of the planar array antenna is the enormous size, combined with the thermal optical properties on the radiating surface of the planar array antenna. These characteristics create a large thermal radiator that is extremely sensitive to the thermal environment. While this is advantageous when dissipating several kilowatts of heat, it becomes a great disadvantage during non-operating or short operating periods. During operational scenarios, planar array antennas are frequently designed to rotate about a single or dual axis off from nadir (earth pointing orientation) to acquire their targets. These rotations from nadir subject the antenna to extreme thermal environments that can be either hot (toward the sun) or cold (away from the sun).

A. If the target location results in the planar array antenna rotating toward the sun, the thermal control system must be able to handle extremely hot environments, several kilowatts of heat dissipation and not exceed its' hot temperature limits.

B. If the target location requires the planar array antenna to rotate toward deep space and the operational duty cycle is low; the thermal control system must be able to handle very cold environments. Several kilowatts of peak heater power can be required to maintain planar array antenna temperatures.

C. In both the hot and cold scenarios, as the planar array antenna rotates away from the nadir, operation times can be severely limited without complicated controls. Typically, rotations beyond a 30-degree rotation from nadir results in shortened operate times and higher heater power requirements.

In addition, during all non-operating modes, it is desirable for the planar array antenna to be nadir pointing to reduce the amount of heater power required. In a "safe mode" and through deployment sequences, it may be difficult to maintain the solar array assembly toward the sun and planar array antenna towards the earth. As a result, several kilowatts of heater power can be required to maintain the planar array antenna within temperature limits.

The lack of "real estate" due to the high density of components makes the installation of heaters difficult. As a result heaters are often applied in non-optimum locations and must depend upon radiation to the local environment, which then provides uniform heating to the planar array antenna. Finally a nadir pointing planar array antenna generally also requires a radome to act as a radiation barrier to the environment.

There have been attempts to combine antenna and solar array collectors. For example, U.S. Pat. No. 4,864,317 "Combination Satellite Antenna-Solar Collector" by P. O. Sorko-Ram. Here the same reflector dish used for satellite communications is coupled to a heat exchanger system. Thus when not operating as an antenna, it can be used to collect solar energy. However, it can not be used in orbit where a solar array must operate simultaneously with the antenna. Also of interest is U.S. Pat. No. 3,594,803 "Integrated Thermoelectric/Generator/Space Antenna Combination" by G. L. Pucillo, et al. The invention is an antenna formed of hot and cold themoelectric element. Thus power can be generated as the antenna transmits to a satellite. Here again, no attempt is made to control the temperature of the antenna.

Thus it is a primary object of the invention to provide a combination solar panel and planar array antenna that eliminates the need for complex thermal control systems.

It is another primary object of the invention to provide a combination solar panel and planar array antenna that uses passive heat exchange techniques control the temperature of each.

It is a further object of the invention to provide a combination solar panel and planar array antenna that eliminates the need for complex thermal control systems that does not require a radome for the planar antenna.

SUMMARY OF THE INVENTION

The invention is a combination solar panel and planar array antenna for a satellite. In detail, the invention includes a generally flat solar array assembly having first (external) and second (internal) surfaces, the first surface having solar energy collecting devices thereon. A generally flat planar array antenna having first (external) and second (internal) surfaces is coupled to the flat solar panel, with the first surface for receiving and transmitting electromagnetic energy. The planar array antenna is coupled to the solar panel assembly such that the internal surfaces of the solar array assembly and the planar array antenna face each other. The internal surfaces of the solar array assembly and the planar array antenna have high emissive thermal coatings. The external surface of the planar array assembly has an absorptive/high emissive thermal coating.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2C is a perspective view of satellite having combined solar panels and planar array antenna in the fully deployed position looking upward at the satellite.

FIG. 2D is a perspective view of satellite having combined solar panels and planar array antenna in the fully deployed position looking downward at the satellite.

FIG. 4 is a cross-sectional view of the satellite shown in FIG. 2D taken along the line 4—4 illustrating the construction of the combined solar panels and planar array antenna.

FIG. 6 is a pictorial representation of a satellite shown in FIG. 2 in orbit about the earth in the safe mode at a beta angle of 66 degrees.

FIG. 7 is a pictorial representation of a satellite shown in FIG. 2 in orbit and in an operating orientation at a beta angle of 0 degrees.

FIG. 8 is a pictorial representation of a satellite shown in FIG. 2 in orbit and in an operating orientation at a beta angle of 66 degrees.

DESCRIPTION OF THE PREFERRED EMBODIMENT

Figure 1:
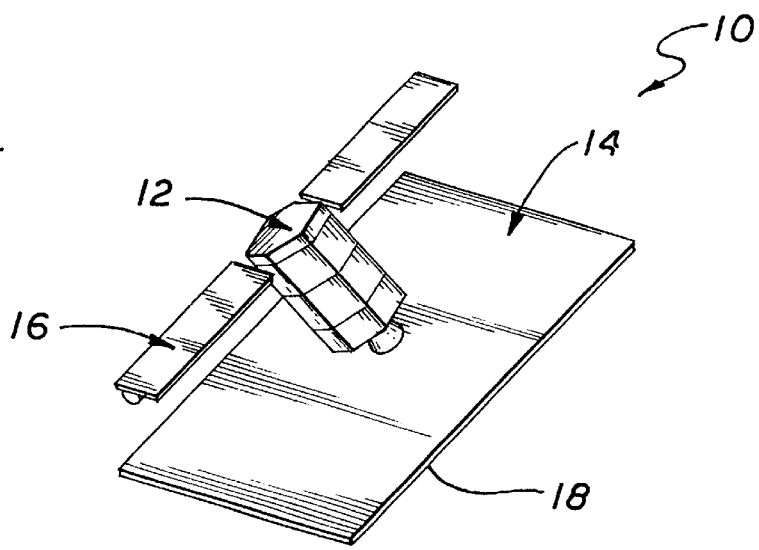
FIG. 1 is a perspective view of a prior art satellite design having separate power generating solar array and planar antenna.
Figure 2A:
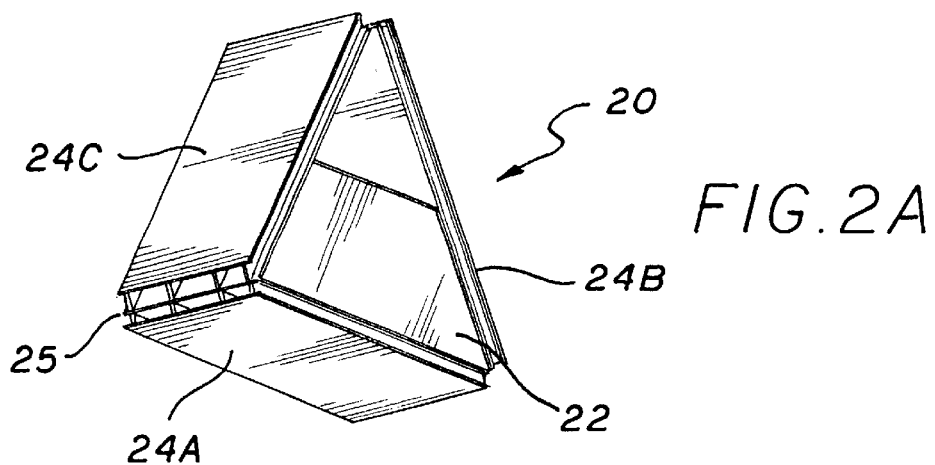
FIG. 2A is a perspective view of satellite having combined solar panels and planar array antenna in the stored position.
Figure 2B:
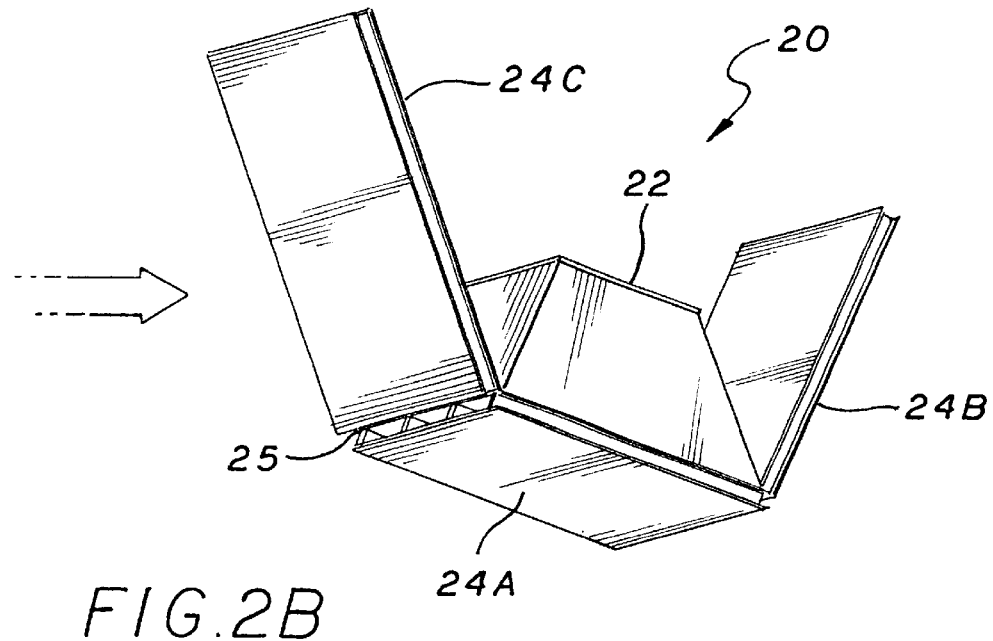
FIG. 2B is a perspective view of satellite having combined solar panels and planar array antenna in the partial deployed position.
Figure 3:
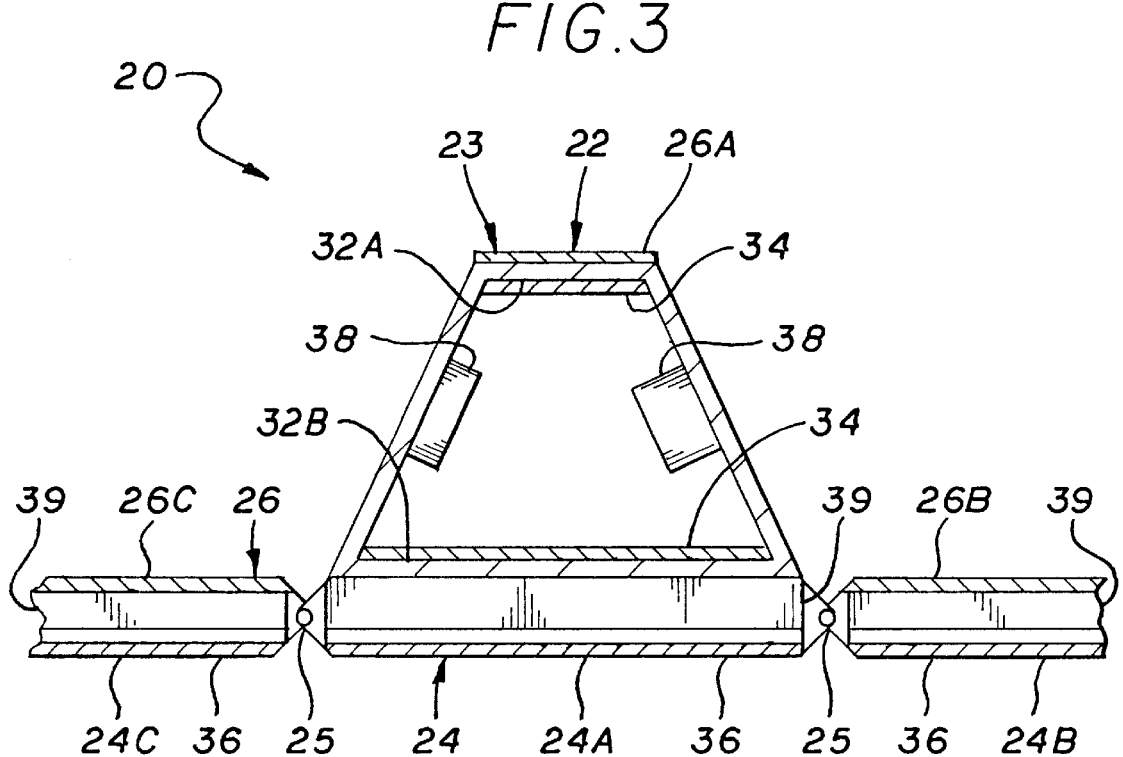
FIG. 3 is a cross-sectional view of the satellite illustrated in FIG. 2D taken along the line 3—3 illustrating the internal structure of the buss.

Referring to FIG. 1, prior art satellite, generally indicated by numeral 10 included a buss 12, containing a separate planar array antenna 14 and power generating solar array 16. A previously discussed, such satellites required sophisticated thermal control system that included a radome 18 over the planar antenna. Often, thermal constraints limited operating duty cycles.

However, referring to FIGS. 2A, 2B, 2C, 2D, 3 and 4, with the satellite, generally indicated by numeral 20, these previously mentioned problems all but disappear. The satellite 20 includes a bus 22 but with a combined assembly 23 of a planar array antenna (typically an electronically steered array or ESA) 24 and power generating solar panel assembly 26. The ESA 24 includes a fixed portion 24A mounted directly on the buss 22 and extendable portions 24B and 24C, mounted by hinges 25 and with interior and exterior principle surfaces 28A and 28B, respectively. The solar array 26 also includes a portion 26A fixed to the buss 22 and extendable portions 26B and 26C joined to the extendable portions 24B and 24C of the ESA 24 and also having interior and exterior principle surfaces 30A and 30B. The satellite 20 is illustrated in the stored condition in FIG. 2A, partially open in FIG. 2B and fully open in FIGS. 2C and 2D.

As shown in FIGS. 2C and 2D, 3 and 4, the interior surfaces 28A and 30A of the solar panel assembly 26 and ESA 24, respectively, as well as the interior surfaces 32A and 32B of the bus 22 are coated with a high emissivity and high absorptivity material 34 such as widely available black paints. For example, Aeroglaze-Z306 manufactured by Lord Corporation, During, Pa. The exterior surface 28B of the ESA 24 is coated with a low absorptivity and high emissivity white paint 36. For example S13GLO manufactured by IIT Research Institute, Chicago, Ill. Of course, components 38 within the bus 22 are independent of the solar array 26 and ESA 24 and incorporate individual heat and cooling systems (not shown). The ESA 24 and solar panel assembly in extendable portions 24B and 24C are supported by beams 39.

This passive approach of mounting the ESA 24 and solar panel assembly 26 together along with the surface coatings produces a synergistic effect allowing both to be maintained within operating temperature limits without the need of active heating or cooling systems. A thermal analysis of four orbital attitudes was analyzed. During non-operating modes the solar lo array assemblies 26 point toward the sun and ESA 24 point away from the sun. The non-operating mode also meets the "safe mode" orientation when the satellite has experienced an anomaly and is under going diagnostic checks.

Figure 5:
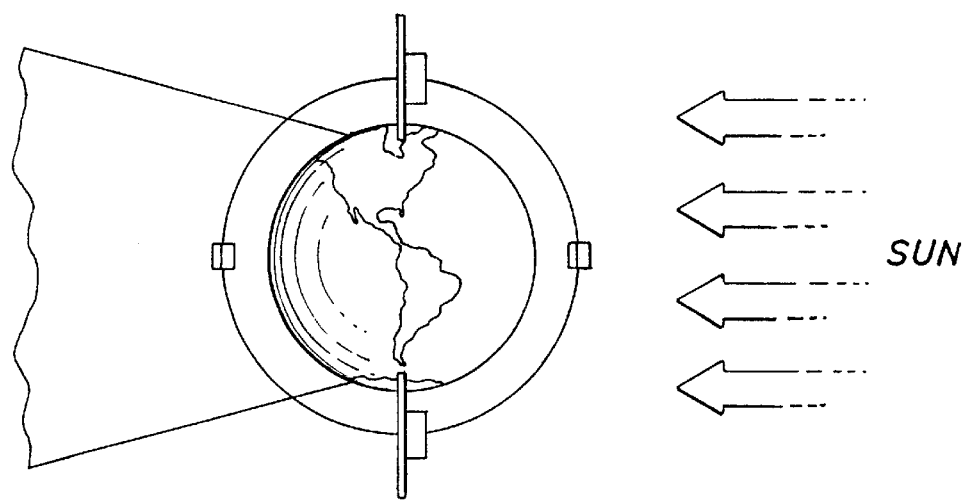
FIG. 5 is a pictorial representation of a satellite shown in FIG. 2 in orbit about the earth in a non-operating mode at a-beta angle of 0 degrees.

1. House keeping mode at a Beta angle of 0 degrees, as illustrated in FIG. 5.
2. House keeping mode at a Beta angle of 66 degrees, as illustrated in FIG. 6.

During operating configurations, the Solar array assembly 26 can rotate up to plus or minus 60 degrees from nadir and the ESA 24 is typically looking toward space (but can be looking toward the sun).

3. Hot operating satellite mode at a Beta angle of 0 degrees, as illustrated in FIG. 7.
4. Hot operating satellite mode at a Beta angle of 66 degrees, as illustrated in FIG. 8

The results of the analysis are provided in FIGS. 9–14. Note that all scenarios maintain the solar panel assembly 26 within −60 to +110 degrees C. design temperature range and the ESA 24 within −40 to +40 degrees C. design temperature range.

Figure 9:
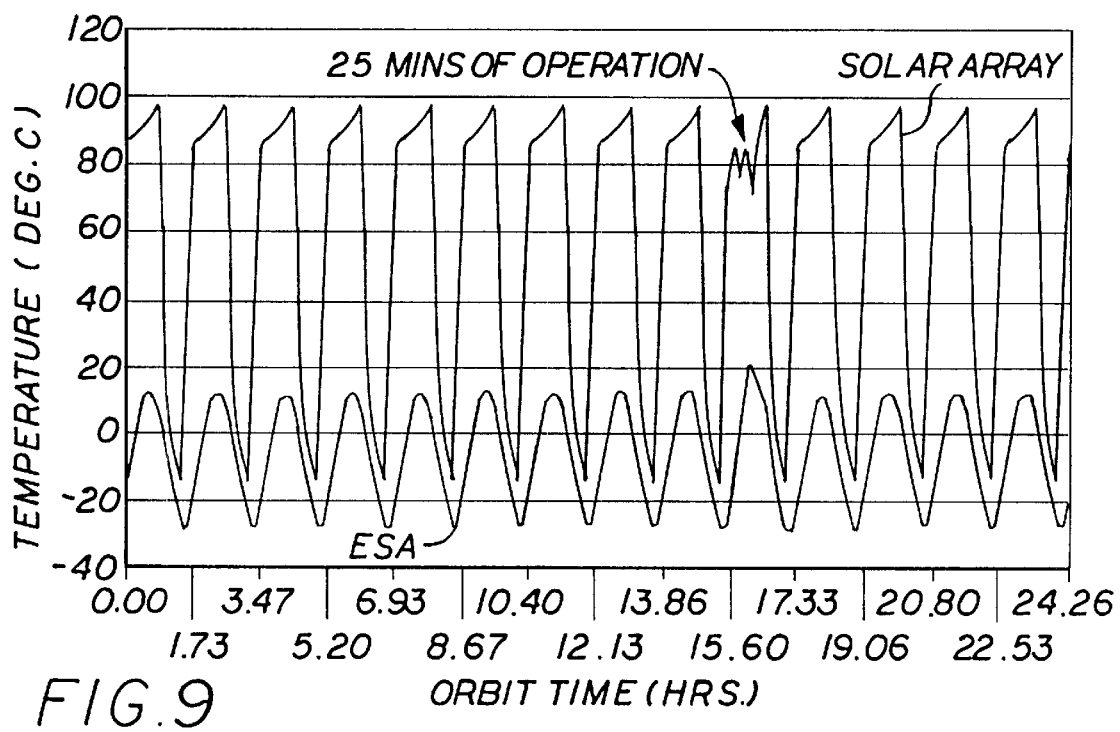
FIG. 9 displays the planar array antenna and solar array assembly temperatures based on 25 minutes per day operation and the remaining time was assumed to be quiescent mode at a Beta angle of 0 degrees.
Figure 10:
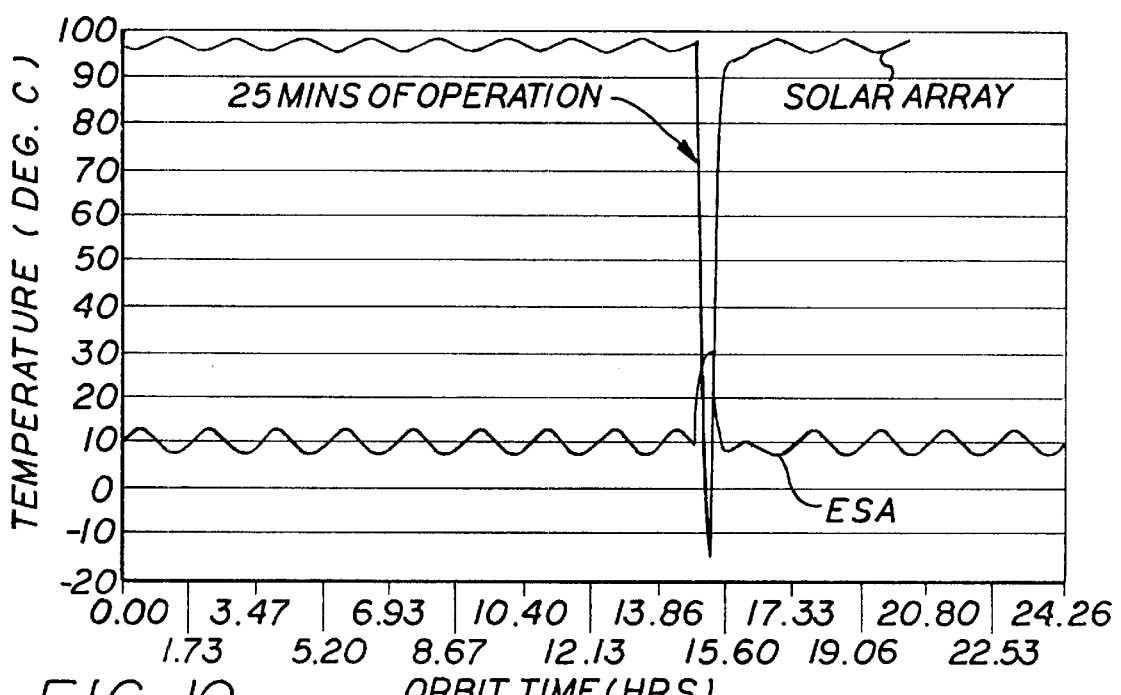
FIG. 10 displays the planar array antenna and solar array assembly temperatures based on 25 minutes per day operation and the remaining time was assumed to be quiescent mode at a Beta angle of 66 degrees.

1. FIG. 9 displays the ESA 26 and solar array assembly 24 temperatures based on 25 minutes per day operation and the remaining time was assumed to be quiescent mode. Beta angle was 0 degrees.
2. FIG. 10 displays the ESA 24 and solar array assembly 26 temperatures based on 25 minutes per day operation and the remaining time was assumed to be quiescent mode. Beta angle was 66 degrees.

Figure 11:
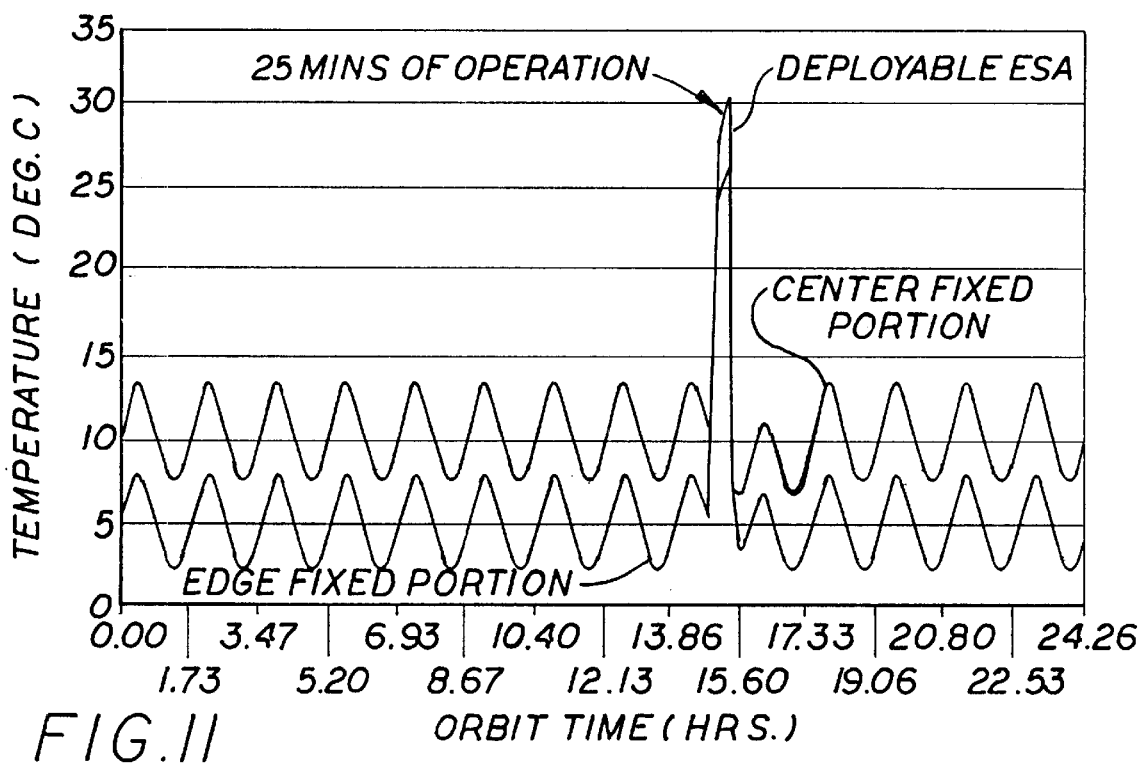
FIG. 11 displays the planar array antenna temperatures at the deployable portion of the antenna edge of fixed portion of antenna and center of fixed portion of antenna based on 25 minutes per day operation and the remaining time was assumed to be quiescent mode at a Beta angle of 66 degrees.
Figure 12:
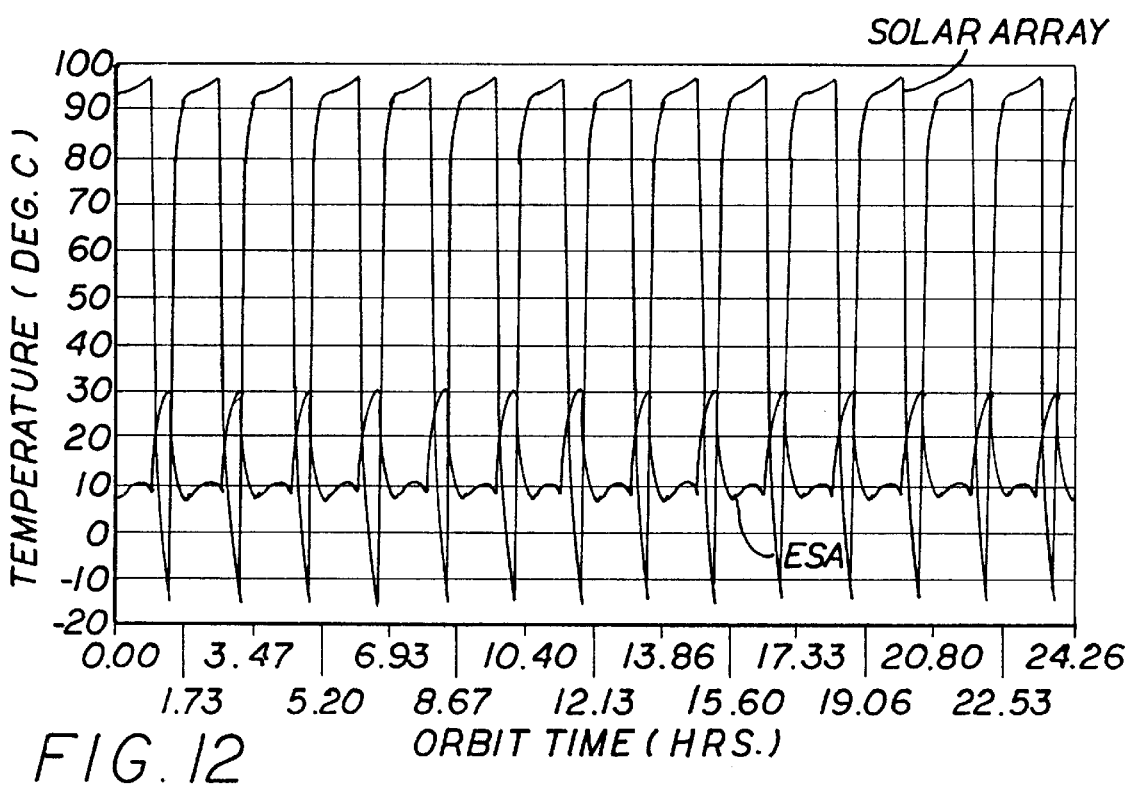
FIG. 12 displays the planar array antenna and solar panel assembly temperatures based on 25 minutes per revolution operation and the remaining time was assumed to be quiescent mode at a Beta angle of 66 degrees.
Figure 13:
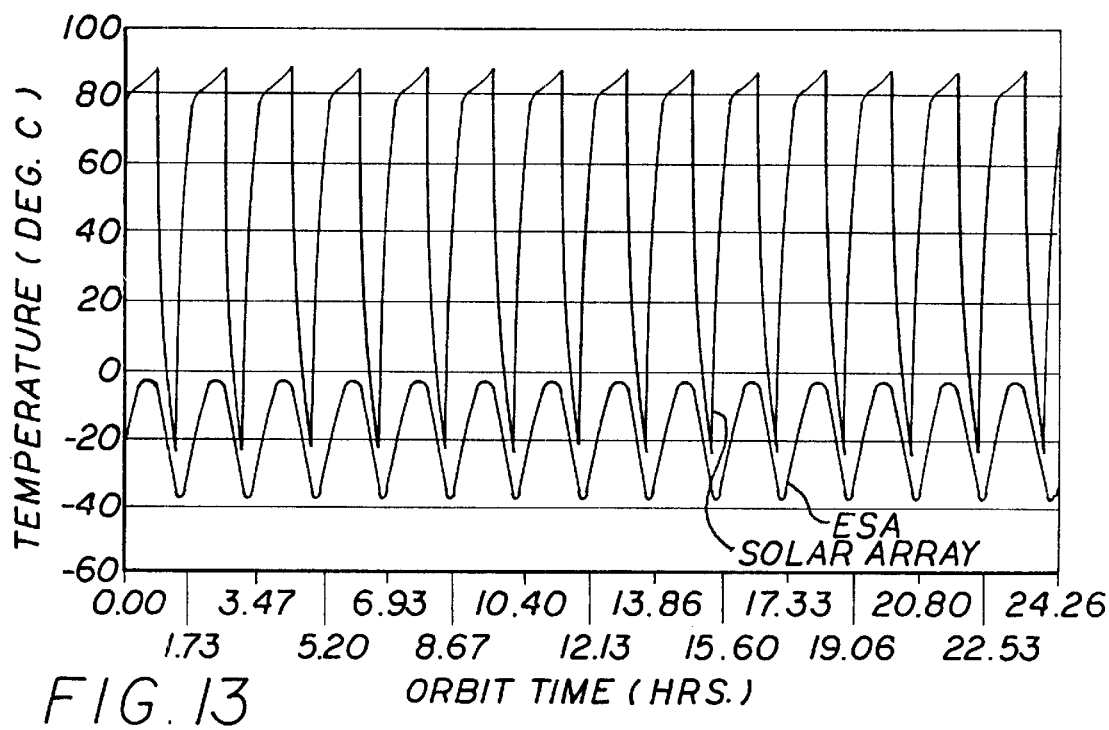
FIG. 13 displays the planar array antenna and solar panel assembly temperatures during quiescent mode at a Beta angle of 0 degrees.
Figure 14:
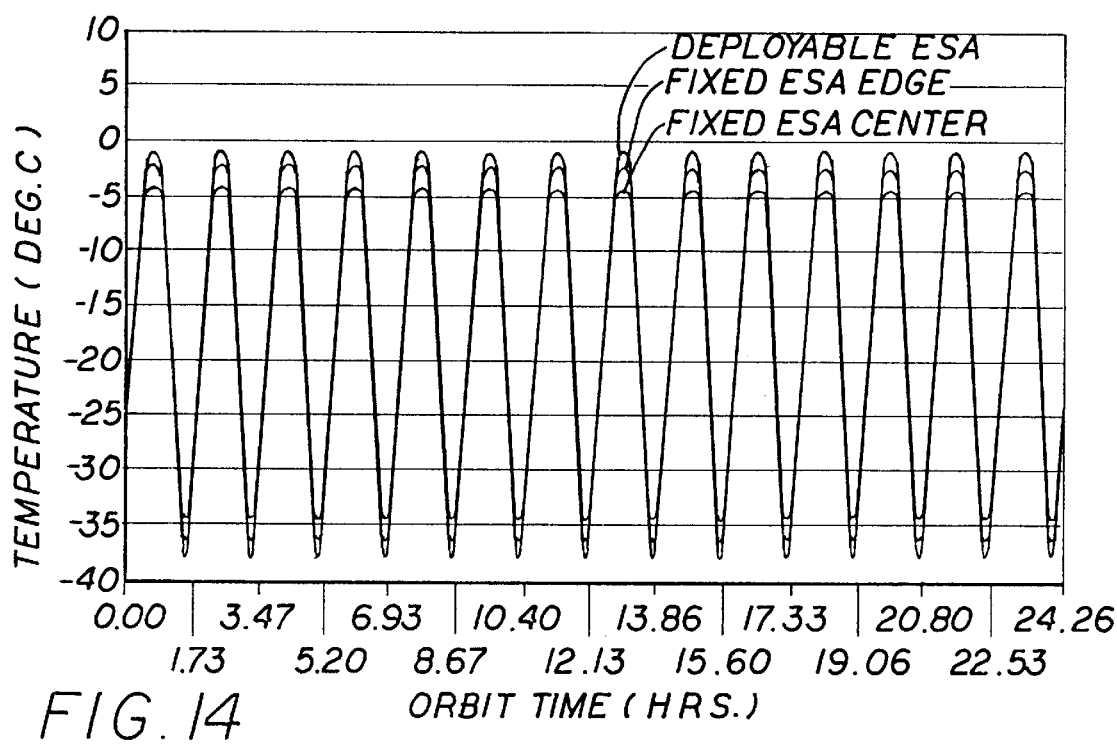
FIG. 14 displays the planar array antenna temperature gradients at the deployable portion of antenna, edge of fixed portion of the antenna and center of fixed portion of antenna during quiescent mode at a Beta angle of 0 degrees.

3. FIG. 11 displays the ESA 24 temperatures at the deployable (extendable) portions of the ESA 24B and 24C, edge of fixed portion of ESA 24A and center of fixed portion of ESA based on 25 minutes per day operation and the remaining time was assumed to be quiescent mode. Beta angle was 66 degrees.
4. FIG. 12 displays the ESA 24 and solar panel assembly 26 temperatures based on 25 minutes per revolution operation and the remaining time was assumed to be quiescent mode. Beta angle was 66 degrees.
5. FIG. 13 displays the ESA 24 and solar panel assembly 26 temperatures during a quiescent mode. Beta angle was 0 degrees.
6. FIG. 14 displays the ESA 24 temperature gradients at the deployable portion of ESA, edge of fixed portion of ESA 24A and center of fixed portion of ESA based during a quiescent mode. Beta angle was 0 degrees.

The use of optical coatings along with the combined ESA 24 and solar array assembly 26 interaction results in a thermal control that is unexpectedly robust. Both the ESA 24 and solar array assembly 26 are passively maintained with their operating design limits during quiescent mode operation and while operating for 25 minutes per day. Without changing the thermal control the ESA 24 is easily capable of operating 25 minutes per revolution. In addition, the integrated ESA 24 and solar array assembly 26 has several other obvious benefits.

1. Satellite design is simplified:
   a. Mechanical Solar array assembly tracking devices are not needed, reducing the complexities of mechanisms.
   b. Only one deployment sequence is required to deploy both the ESA and solar array assembly, reducing the required vehicle flight software/commanding, and overall complexity.
   c. Fewer mechanisms are required to stow and deploy the integrated ESA and solar array assembly.
2. Size of the solar array assembly with corresponding thermal optical properties does not have as predominant an effect on the thermal control. The radiative interchange between the ESA and solar array assembly has a dominant effect in the thermal control system. Since the ESA's provide a cold environment to the solar array assembly during operational scenarios, the solar array assembly is not limited in operating time. In addition, rotations away from nadir during operational scenarios do not drive the temperatures resulting in fewer restrictions while operating.
3. Special spacecraft orientations or thermal control systems are not needed for "safe mode" operation due the integrated ESA and solar array assembly. This eliminates the complexities associated with heaters and reduces spacecraft software required to define new safe mode orientations.
4. Since the ESA and solar array assembly temperatures are maintained within their design limits through this passive thermal control technique, heaters are no longer required, totally eliminating all of the issues that arise with the use thereof.
5. Since the environment is now a secondary effect to the thermal control system, the radome is no longer required. The exterior surface of the ESA can be just painted white.

While the invention has been described with reference to particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the satellite manufacturing industry.

What is claimed is:

1. A satellite comprising:
   a bus assembly containing a payload and comprising a first end;
   a combination solar array assembly and planar array antenna disposed on and interconnected with said first end of said bus assembly, said combination solar array assembly and planar array antenna comprising:
      a solar panel assembly comprising interior and exterior solar panel assembly principle surfaces;
      a planar array antenna disposed in spaced relation to and structurally interconnected with said solar panel assembly, wherein said planar array antenna comprises interior and exterior planar array antenna principle surfaces, wherein said planar array antenna is interconnected with said solar panel assembly such that said interior solar panel assembly principle surface projects toward and is in opposing relation to said interior planar array antenna principle surface.

2. The satellite as set forth in claim 1, wherein said interior solar panel assembly principle surface and said interior planar array antenna principle surface each comprise a high emissive thermal optical coating.

3. The satellite as set forth in claim 1, wherein said exterior planar array principle surface has a low thermal optical absorptivity and high thermal optical emissivity.

4. A combination solar panel assembly and planar array antenna for a satellite comprising:
   a solar panel assembly comprising interior and exterior solar panel assembly principle surfaces;
   a planar array antenna disposed in spaced relation to and structurally interconnected with said solar panel assembly, wherein said planar array antenna comprises interior and exterior planar array antenna principle surfaces, wherein said planar array antenna is interconnected with said solar panel assembly such that said interior solar panel assembly principle surface projects toward and is in opposing relation to said interior planar array antenna principle surface; and
   a plurality beams that extend between and interconnect said interior solar panel assembly principle surface and said interior planar array antenna principle surface.

5. The combination solar panel assembly and planar array antenna as set forth in claim 4, wherein said interior solar panel assembly principle surface and said interior planar array antenna principle surface each comprise high emissive thermal surfaces.

6. The combination solar panel assembly and planar array antenna as set forth in claim 5, wherein said exterior planar array principle surface includes a low absorptivity and high emissivity surface.

7. The satellite as set forth in claim 1, wherein said solar panel assembly and said planar array antenna are disposed in parallel relation.

8. The satellite as set forth in claim 1, further comprising a plurality beams that are disposed in spaced relation and that extend between and interconnect said interior solar panel assembly principle surface and said interior planar array antenna principle surface.

9. The satellite as set forth in claim 1, wherein said combination solar array assembly and planar array antenna comprises a first portion that extends away relative to a first side of said bus assembly in a deployed position, a second portion disposed under and in interfacing relation with said first end of said bus assembly in both a stored position and a deployed position, and a third portion that extends away relative to a second side of said bus assembly in a deployed position, wherein said first and third portions extend away from said bus assembly in opposite directions, wherein said first, second, and third portions each include part of both said solar panel assembly and said planar array antenna.

10. The satellite as set forth in claim 9, wherein said combination sonar array assembly and planar array antenna comprises first and second hinges, wherein said first hinge interconnects said first and second portions of said combination solar array assembly and planar array antenna, and wherein said second hinge interconnects said second and third portions of said combination solar array assembly and planar array antenna.

11. The satellite as set forth in claim 10, wherein said first portion of said combination solar array assembly and planar array antenna is disposed against said first side of said bus assembly in a stored position, and wherein said third portion of said combination solar array assembly and planar array antenna is disposed against said second side of said bus assembly in a stored position.

12. The satellite as set forth in claim 1, wherein said interior solar panel assembly principle surface and said interior planar array antenna principle surface each comprise a coating of a high emissivity and high absorptivity material.

13. The satellite as set forth in claim 1, wherein said exterior planar array antenna principle surface comprises a coating of a low absorptivity and high emissivity white paint.

14. The satellite as set forth in claim 1, wherein said exterior solar panel assembly principle surface comprises a solar energy collecting surface, and wherein said exterior planar array antenna principle surface receives and transmits electromagnetic energy.

15. The satellite as set forth in claim 4, wherein said solar panel assembly and said planar array antenna are disposed in parallel relation.

16. The satellite as set forth in claim 4, wherein said combination solar array assembly and planar array antenna comprises first, second, and third portions, with said second portion being disposed between said first and third portions, wherein said combination solar array assembly and planar array antenna further comprises a first hinge that interconnects said first and second portions and a second hinge that interconnects said second and third portions, wherein said first, second, and third portions each include part of both said solar panel assembly and said planar array antenna.

17. The satellite as set forth in claim 4, wherein said interior solar panel assembly principle surface and said interior planar array antenna principle surface each comprise a coating of a high emissivity and high absorptivity material.

18. The satellite as set forth in claim 4, wherein said exterior planar array antenna principle surface comprises a coating of a low absorptivity and high emissivity white paint.

* * * * *

UNITED STATES PATENT AND TRADEMARK OFFICE
CERTIFICATE OF CORRECTION

PATENT NO. : 6,394,395 B1
DATED : May 28, 2002
INVENTOR(S) : Poturalski et al.

It is certified that error appears in the above-identified patent and that said Letters Patent is hereby corrected as shown below:

Column 2,
Line 23, please delete "themoelectric" and insert therefore -- thermoelectric --

Signed and Sealed this

Thirty-first Day of December, 2002

JAMES E. ROGAN
*Director of the United States Patent and Trademark Office*